US008115666B2

(12) United States Patent
Moussally et al.

(10) Patent No.: US 8,115,666 B2
(45) Date of Patent: Feb. 14, 2012

(54) GROUND PENETRATING SYNTHETIC APERTURE RADAR

(75) Inventors: George J. Moussally, Fremont, CA (US); Philip A. Fialer, Palo Alto, CA (US); Gary R. Dorff, Los Altos, CA (US)

(73) Assignee: Mirage Systems, Inc., Sunnyvale, CA (US)

( * ) Notice: Subject to any disclaimer, the term of this patent is extended or adjusted under 35 U.S.C. 154(b) by 81 days.

(21) Appl. No.: 12/385,766

(22) Filed: Apr. 17, 2009

(65) Prior Publication Data

US 2010/0052970 A1    Mar. 4, 2010

Related U.S. Application Data

(60) Provisional application No. 61/071,223, filed on Apr. 17, 2008.

(51) Int. Cl.
*G01S 13/00* (2006.01)
*G01S 13/08* (2006.01)

(52) U.S. Cl. ....... 342/22; 342/25 R; 342/25 A; 342/128; 342/132

(58) Field of Classification Search ............ 342/22, 342/25 R, 25 A, 25 B, 25 C, 25 D, 25 E, 342/25 F, 128–144
See application file for complete search history.

(56) References Cited

U.S. PATENT DOCUMENTS

| 3,790,939 | A | * | 2/1974 | Constant | 342/25 F |
| 4,005,423 | A | * | 1/1977 | Webb | 342/194 |
| 4,045,795 | A | * | 8/1977 | Fletcher et al. | 342/25 E |
| 4,246,580 | A | * | 1/1981 | Caputi, Jr. | 342/25 F |
| 4,309,703 | A | * | 1/1982 | Blahut | 342/201 |
| 4,325,065 | A | * | 4/1982 | Caputi, Jr. | 342/25 F |
| 4,355,311 | A | * | 10/1982 | Frosch et al. | 342/25 A |
| 4,509,048 | A | * | 4/1985 | Jain | 342/25 R |
| 4,851,848 | A | * | 7/1989 | Wehner | 342/25 D |
| 4,910,520 | A | * | 3/1990 | Rosen et al. | 342/25 A |
| 4,924,229 | A | * | 5/1990 | Eichel et al. | 342/25 E |
| 4,963,877 | A | * | 10/1990 | Wood et al. | 342/25 A |
| 4,968,968 | A | * | 11/1990 | Taylor | 342/174 |
| 5,061,931 | A | * | 10/1991 | Farina et al. | 342/25 F |
| 5,260,708 | A | * | 11/1993 | Auterman | 342/25 C |
| 5,264,852 | A | * | 11/1993 | Marquet | 342/26 A |
| 5,394,151 | A | * | 2/1995 | Knaell et al. | 342/25 F |
| 5,424,742 | A | * | 6/1995 | Long et al. | 342/25 C |
| 5,673,050 | A | * | 9/1997 | Moussally et al. | 342/22 |
| 5,745,069 | A | * | 4/1998 | Gail | 342/25 F |
| 5,777,574 | A | * | 7/1998 | Robinson | 342/25 A |
| 5,815,111 | A | * | 9/1998 | Gouenard et al. | 342/25 A |
| 5,952,954 | A | * | 9/1999 | Beckner | 342/22 |
| 6,091,354 | A | * | 7/2000 | Beckner et al. | 342/22 |
| 6,657,577 | B1 | * | 12/2003 | Gregersen et al. | 342/22 |
| 6,664,914 | B2 | * | 12/2003 | Longstaff et al. | 342/22 |
| 6,750,809 | B1 | * | 6/2004 | Cho et al. | 342/129 |
| 6,919,839 | B1 | * | 7/2005 | Beadle et al. | 342/25 R |

(Continued)

*Primary Examiner* — Thomas Tarcza
*Assistant Examiner* — Peter Bythrow
(74) *Attorney, Agent, or Firm* — Welsh Flaxman & Gitler LLC

(57) ABSTRACT

A method and system for examining subsurface targets utilizing an elevated or airborne platform. A broad spectrum of frequencies is transmitted from the platform and is directed at the various subsurface targets. A plurality of chirp signals would be utilized to transmit the entire frequency range. These signals are reflected from the various subsurface targets and are received by the platform. The received chirp signals are combined in a manner to allow the visualization of the subsurface target.

14 Claims, 6 Drawing Sheets

U.S. PATENT DOCUMENTS

| | | | |
|---|---|---|---|
| 6,965,341 B1 * | 11/2005 | Cho et al. | 342/25 A |
| 7,106,242 B2 * | 9/2006 | Kinghorn | 342/25 A |
| 7,362,261 B2 * | 4/2008 | Flacke | 342/132 |
| 7,391,362 B2 * | 6/2008 | Beckner | 342/179 |
| 7,474,255 B2 * | 1/2009 | Hsieh et al. | 342/95 |
| 7,528,762 B2 * | 5/2009 | Cerwin | 342/22 |
| 7,598,900 B2 * | 10/2009 | Iverson | 342/25 F |

* cited by examiner

Block Diagram of System

Figure 3 - Transmit-Receive Timing Example

GROUND PENETRATING SYNTHETIC APERTURE RADAR

CROSS-REFERENCE TO RELATED APPLICATION

The present application claims the priority of provisional patent application Ser. No. 61/071,223, filed on Apr. 17, 2008, and incorporates all of the material therein by reference.

BACKGROUND OF THE INVENTION

A number of systems have been developed to determine the composition of the earth, both at a distance near the earth's surface as well as a distance many miles below the earth's surface. For example, a shock wave is generated at the earth's surface or below the earth's surface and various sensors having utilized to sense the return wave and to process this return wave which would be an indication of the composition of the subterranean layer of the earth.

A system has been developed for determining the character of a subterranean region close to the earth's surface employing ground penetrating radar. For example, U.S. Pat. No. 3,806,795, issued to Morey repeatedly uses ground penetrating radar pulses with rise times in the order of 1 nanosecond to generate a profile chart indicating the magnitude of the reflected signals and the depths or times in which they occur. This system employs the same antenna for transmitting and receiving signals and does not utilize a synthetic aperture radar (SAR) technique, nor does it use three dimensional imaging of the reflective signals.

U.S. Pat. No. 4,325,065 and U.S. Pat. No. 4,246,580, both issued to Caputi, Jr., teach the use of a bistatic radar technique employing a spotlight SAR and stretch linear FM modulation with Fourier Transform processing. The receiver and transmitter are mounted on different aircraft which have different positions and motions during the data gathering process. Not only do these patents relate to a system in which bistatic synthetic aperture radar data and not monostatic data is important, these patents do not describe an apparatus in which the subterranean section close to the earth's surface is investigated.

U.S. Pat. No. 5,673,050, issued to Moussally et al, was developed to perform non-invasive subsurface characterization in numerous practical situations including location and characterization of buried waste, location of underground utilities and structures prior to excavation operations and the determination of subsurface geological conditions for construction, mineral extraction and environmental purposes, in depths close to the earth's surface. This system employs a stand-off, oblique angle illumination of the subsurface region using an interrupted frequency modulated continuous wave (FMCW) operation of the radar. The system would use a bandwidth of greater than one decade as well as a spotlight SAR geometry. The system would employ a near-Brewster angle illumination of the ground used to reduce losses. A radar platform would be provided in an airborne vehicle, such as a helicopter which would circumscribe the subsurface area of interest.

SUMMARY OF THE INVENTION

The deficiencies of the prior art are addressed by the present invention which is directed to a ground penetrating synthetic aperture radar (GPSAR) system. The system is provided on an airborne or elevated platform which would both generate a signal and collect a signal from a subsurface object. The airborne platform can be, but is not limited to, fixed wing aircraft, rotorcraft and UAV. The initial received signal which is analog in nature will then be digitized and transmitted to a data storage unit, allowing the data to be visualized which would provide an indication of the nature of the subsurface object. The present invention is directed to a compact, lightweight ground penetrating synthetic aperture radar (GPSAR) that employs an interrupted frequency-modulated continuous wave (IFMCW) signal format. Radar data is collected from surface and subsurface objects that are imaged via synthetic aperture radar processing. Because the GPSAR utilizes relatively low radar frequencies (300 MHz-3000 MHz) and an ultra wide bandwidth of operating frequencies, the system of the present invention achieves ground and foliage penetration while having fine spatial resolution. The system operates in a monostatic mode utilizing an RF transceiver connected to a transmit-receive switch connected to a single antenna.

The transceiver products a transmission pulse, the length of which is only a small fraction of the length of a single chirp required to cover the entire frequency spectrum. Therefore, a plurality of chirp signals, each chirp signal containing a portion of the frequency spectrum would be transmitted. Each of the transmitted signals would be reflected from the area of interest and would be received in the elevated or airborne platform. Since each received signal would only include a relatively small portion of the entire frequency band, a plurality of received signals must be combined in a manner to create a composite signal. In most situations, this composite signal would include duplicating frequencies. The present invention utilizes a system in which the duplicating frequencies in the frequency band would be used as a reference for converting and storing the signals in a manner allowing the visualization of the target.

For a more complete understanding of the present invention, reference should now be made to the embodiments illustrated in greater detail in the accompanying drawings and described below by way of example.

For instance, although the present invention is designed to operate using an airborne platform, it can also characterize and accurately geolocate subsurface items from a land-based platform. The preferred altitude range of the present invention extends from approximately 300 feet to approximately 5000 feet. If the platform is airborne, it can operate at a maximum velocity of approximately 125 knots.

DETAILED DESCRIPTION OF THE PRESENT INVENTION

Figure 1:
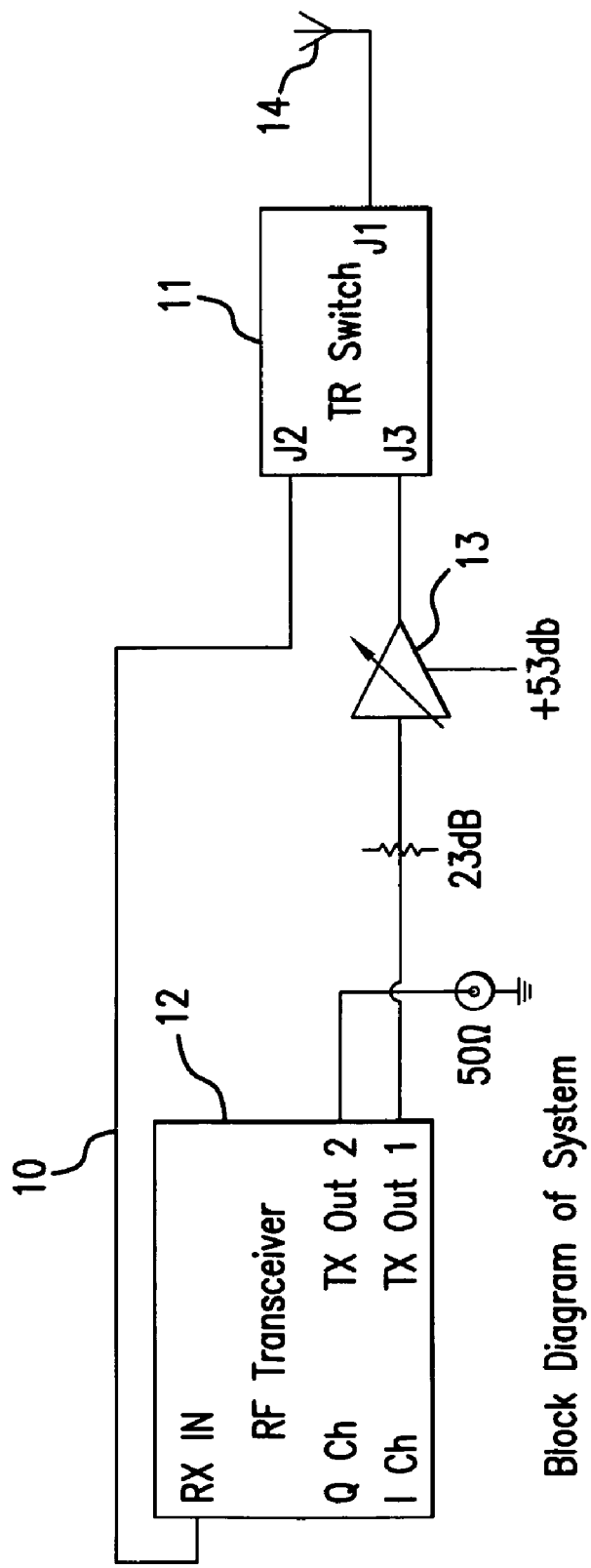
FIG. 1 is a block diagram showing the entire system of the present invention.

FIG. 1 illustrates a block diagram 10 of the present invention. This diagram includes an RF transceiver 12 connected to a transmit-receive (T-R) switch 11 which is in turn connected to an antenna 14 for the transmission and receipt of the RF signals. An amplifier 13 is provided between the RF transceiver 12 and the T-R switch 11.

The present invention is designed to operate in the approximate range of 300-3000 MHz. A transmission signal is produced by the RF transceiver which is sent along the appropriate transmission media to the amplifier 13 and then to the T-R switch 11 to be transmitted from the antenna 14. The RF transceiver is illustrated with two connectors denoted as TX Out 1 and TX Out 2. Due to the relatively large bandwidth, prior designs utilized two antennas to transmit and receive the appropriate signal. However, the present invention can operate with the utilization of only a single antenna 14. The appropriate signal produced by the RF transceiver 12 will exit the transceiver through TX Out 1, as amplified by the amplifier 13 and is connected to the J3 port of the T-R switch 11. The signal would leave the T-R switch 11 at interface port J1 to be transmitted by the antenna 14. The reflected signals are received by the antenna 14 and transmitted to interface port J1. The signal would then be transmitted from port J2 of the T-R switch 11 and received by the RX In port of the RF transceiver 12.

The RF transceiver is provided with two I/Q baseband outputs as well as an external 100 MHz reference input (not shown with respect to the RF transceiver). Transmit path blanking and receive path blanking connectors are also provided and not shown.

Since the signals received by the antenna 14 and transmitted to the RF transceiver 12 are analog in nature, the I/Q baseband outputs are connected to a system for converting these analog signals into digital signals. Both the real and imaginary values of the received signals are transmitted to the analog/digital converter.

The T-R switch 11 is a COTS pin diode RF switch with high oscillation, fast switching times and low insertion rates. For example, diode SWN-218-2 DR-STD manufactured by American Microwave can be modified to handle the range of 300-3000 MHz and high power.

Amplifier 13 could be a COTS RF GaN solid state amplifier manufactured by Comtech PST, model #BME27258-30. It has the capability to amplify signals from 20 MHz and 25 W at 1 dB compression.

Although not shown in FIG. 1, a Vmetro c5000 compact PCI board moves the data from the analog/digital converter connected to the RF transceiver 12 to a standard storage device for storing and then visualizing the captured data.

The present invention utilizes a COTS log periodic antenna 14 covering the frequency band of 300-3000 MHz and is denoted as part TDK RF SLP-3003. Although the present invention does specify the exact components which are used for the various subsystem, it is noted that it might be possible to utilize other models to perform the same function.

Figure 2:
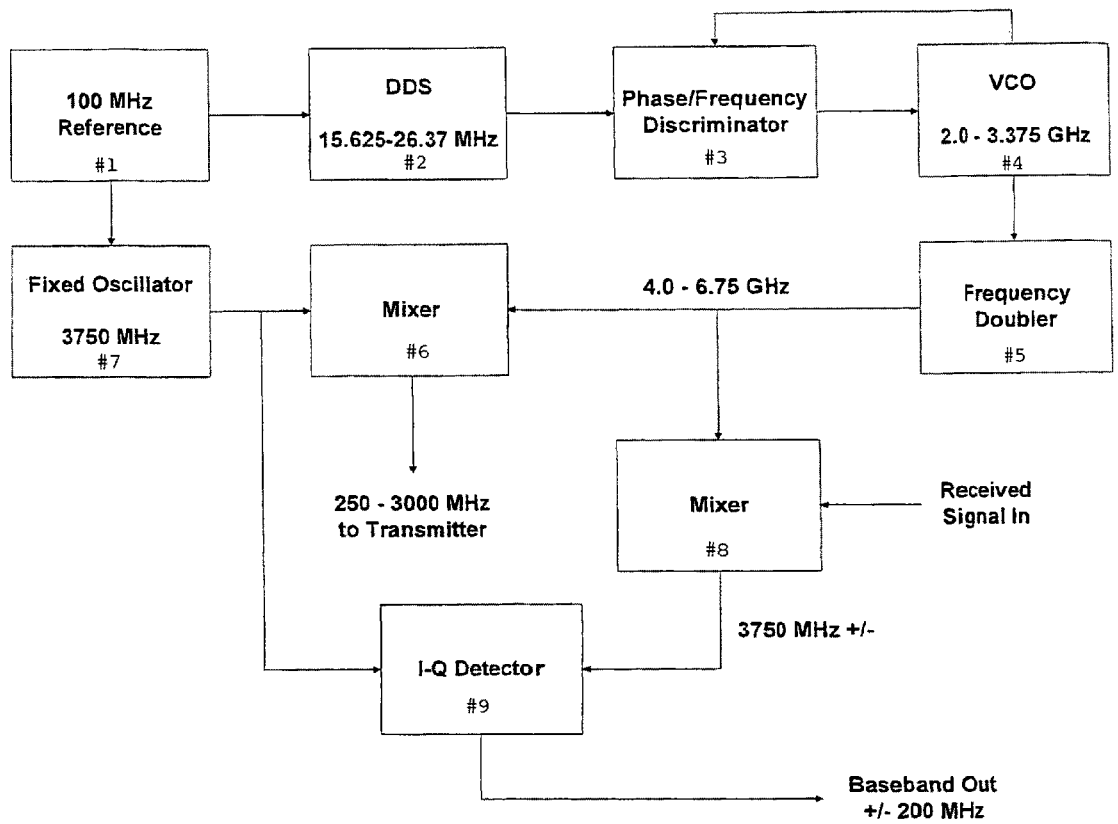
FIG. 2 is a block diagram of the radio frequency waveform generator and transceiver shown in FIG. 1.

FIG. 2 is a block diagram of the RF transceiver 12 illustrated in FIG. 1. A 100 MHz reference generator 1 is a stable, high-positioned, oven controlled crystal oscillator (OCXO) that serves as the master clock for all key signals. The reference generator 1 is in communication with a direct digital synthesizer (DDS) 2 serving as the basic function generator to form a linear frequency modulated continuous wave (FMCW) signal or "chirp". Block 1 provides the frequency reference input to the DDS 2. Under firmware control, the DDS 2 is capable of generating a wide variety of "chirp" signals with frequencies varying between 15.625 MHz and 26.367 MHz, with chirp slope varying from 5 kHz per microsecond to 200 kHz per microsecond.

The chirp output from the DDS 2 provides the input to a phase/frequency discriminator 3. This phase/frequency discriminator 3 along with a voltage controlled oscillator (VCO) 4 functions as a phase-locked loop (PLL) acting as a 128× frequency multiplier that is phase-locked to the chirp output of the DDS 2. The VCO can operate at a range of 2000-3375 MHz. The phase/frequency discriminator 3 consists of an ultra high speed digital phase frequency discriminator capable of directly comparing phase/frequency inputs up to 200 MHz as well as a low-pass filter that is fed by the output of the discriminator 3 as fed back from the VCO 4. The output of the low-pass filter provides the error control signal to the VCO 4 needed to implement the PLL comprising the phase/discriminator 3 as well as the VCO 4.

The VCO 4 serves as one element of the phase-locked loop. The output of the PLL VCO is a chirp signal whose frequency is relative to the frequency of the phase/frequency discriminator 3 whose input signal is 128 times higher or in the range of 2000 MHz to 3375 MHz. One of the outputs of the VCO 4 is transmitted to a passive frequency doubler 5 for multiplying the frequency of the input signal generated by the VCO 4 by a factor of two. This device provides a chirp output signal in the frequency range of 4000 MHz to 6750 MHz.

The output of the frequency doubler 5 is transmitted to a first double-balanced mixer 6 as used as a frequency down-converter which translates the frequency of the chirp signal output from the frequency of doubler 5 from the frequency range of 4000 MHz through 6750 MHz to a frequency in the range of 250 MHz through 3000 MHz after being mixed with the output of a fixed oscillator 7 having a stable continuous wave frequency of 3750 MHz. The fixed oscillator 7 consists of a VCO configured in a phase-locked loop to provide the continuous wave frequency which is phase-locked to the reference frequency 1. A second double balanced mixer 8 is used as a frequency down-converter to translate the frequency of the chirp signal output of the frequency doubler from the range of 4000 MHz through 6750 MHz to the carrier frequency of 3750 MHz. This carrier signal is modulated by target information contained in the GPSAR return signal. In this device, the output of the frequency doubler is mixed with the received signal of the GPSAR.

The output of the mixer 8 is transmitted to an in-phase and quadrature (I-Q) detector 9. The function of this detector 9 is to phase coherently the real and imaginary parts of the modulated portion of the output of the mixer 8. The output of this device contains target information from the return signal of the GPSAR. The output of the fixed oscillator 7 is also transmitted to the I-Q detector 9. The output of the I-Q detector 9 is an output signal of +/−200 MHz.

The data received by the present invention is collected in a complex manner due to the need to operate the radar in a pulse mode, meaning that a transmit interval is followed by a receive interval. The length of the transmit interval is controlled by the radar range to the nearest range of interest, and is set so that the transmitter is OFF and any T-R switching delays are complete before signals from the nearest range are captured by the antenna 14.

Figure 3:
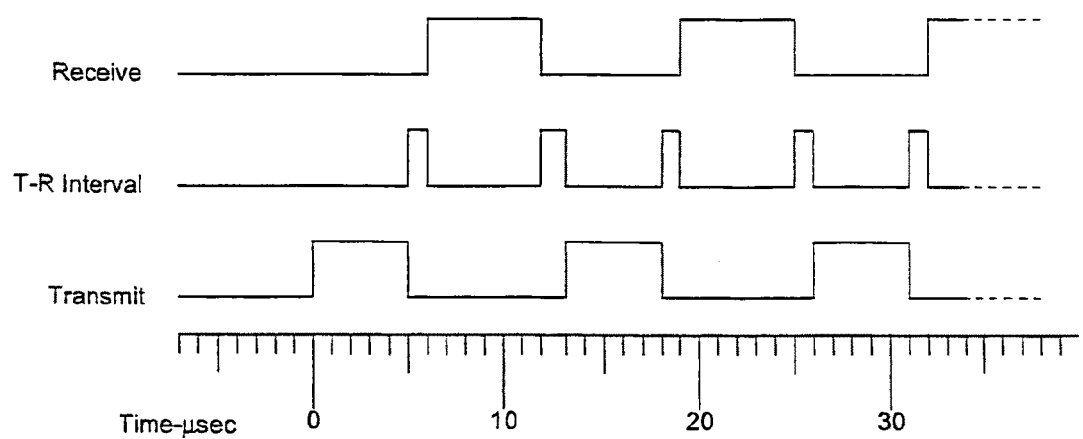
FIG. 3 is a timing diagram of the transmit-receive (T-R) switch.

FIG. 3 shows the timing of the radar pulses for a typical flight data collection. The length of the receive interval is determined by the greatest radar range of interest, and is longer than the transmit interval to insure that all transmitted frequencies from all ranges of interest are collected. For example, the timing diagram shown in FIG. 3 shows that the transmitter is ON for five microseconds, the T-R switching time is 1 microsecond and the receive interval is 6 microseconds. Therefore, the time between the initiation of a transmit signal and the end of a receive signal would be 12 microseconds. As can be appreciated, the specific time illustrated in the figures are exemplary of the present invention and will vary depending on the altitude of the platform, the swath width of the desired data and the actual time required for the T-R switches.

Figure 4:
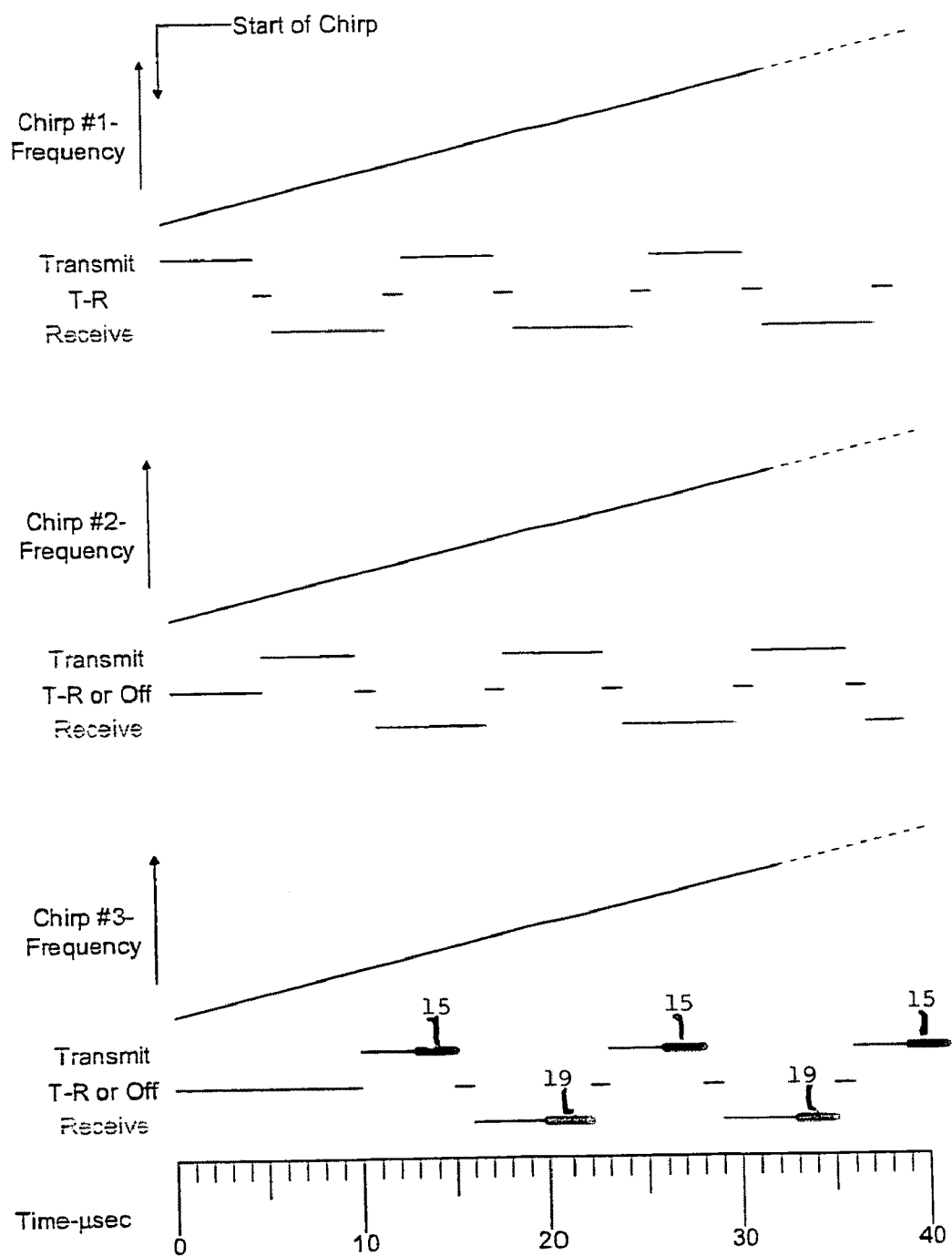
FIG. 4 shows the beginning portion of three chirps operating in a manner to collect a single frequency sweep.

The length of a single pulse is a small fraction of the length of a single chirp required to cover the entire frequency band. The method used to collect all of the frequencies desired is to chirp through the entire frequency range, collecting parts of the desired frequency range, and then repeat the chirp at least three, or more times, thereby collecting different parts of the frequency range. For example, as shown in FIG. 4, the second chirp of the series of chirps will start its first transmission at exactly the frequency where the first transmission of chirp one ended, filling in adjacent frequency bands throughout the second chirp. For some waveforms, the third chirp will fill in all of the missing frequencies not included in the first two chirps.

Figure 5:
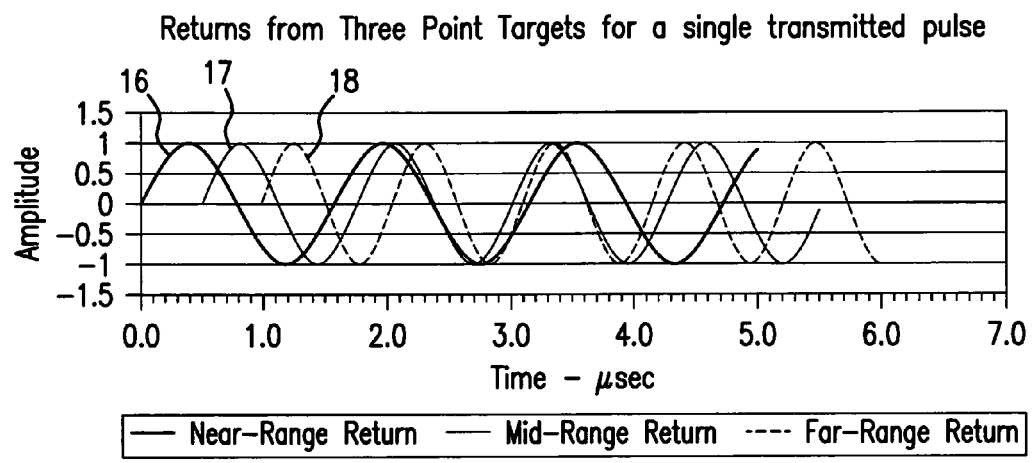
FIG. 5 is a diagram showing the returns from three point targets at different ranges from the radar for a single transmitted pulse.

As shown in FIG. 5 and denoted by 15, the third chirp will include some duplication of the frequencies transmitted and collected by the first chirp. However, due to the overhead associated with the T-R switching time, for some waveforms, more than three chirps may be needed to collect all frequencies. It has been determined that the present invention can operate effectively utilizing between three and approximately ten chirps. In the context of transmitting and receiving the chirp signals, it is noted that a relatively large number of ON and OFF times are employed for each chirp sweep which is needed to allow the present invention to "listen" to the received data.

The start and stop of all system functions are controlled by a timing generator operating at a 100 MHz rate, resulting in a 10 nsec period timing increment. The aforementioned A/D converters can operate at higher rates of up to 120 MHz. However, the start of the data collections for each transmitted pulse occurs on a 10 nsec boundary, and the number of samples collected is always increased if necessary to insure that the end of the data collection will also occur on a 10 nsec boundary. Each block of data collected consists of samples in the receive window following one transmitted pulse. It can also be appreciated that based upon the parameters of the timing generator, the timing increments can be changed.

Figure 6:
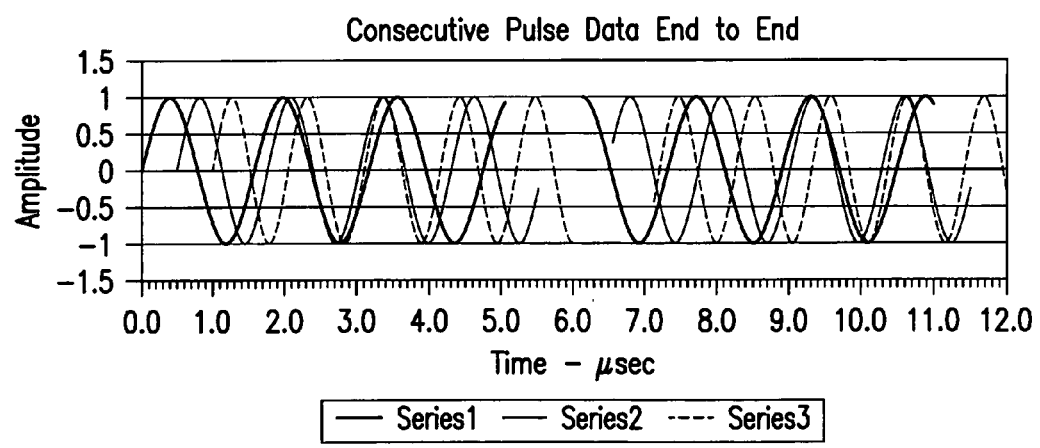
FIG. 6 illustrates a consecutive pulse data end to end diagram.

FIG. 5 illustrates the signals that are expected to be received during one received interval. This graph contains waveforms 16, 17 and 18. Waveform 16 is the expected result from a near range target. Waveform 17 is the expected result from a midrange target, and waveform 18 is the expected result from a far range target. The minimum range return has the lowest frequency and would begin very close to the start of the received interval and ends when all of the transmitted energy from the near range has returned to the radar. Energy from the midrange target as illustrated in waveform 17 will be received after the initial receipt of the near range target and would end subsequent to the end of the receipt of the near range target. The signal 18 received from the far range target would begin subsequent to the initial receipt of the signal from the midrange target and would continue until the end of the received interval. The data must be reassembled so that a continuous wave is observed for each of the three targets over the entire frequency range. If data from the second frequency interval is simply appended to the data from the first frequency interval, this would not occur since the received data of interest in each case is only 5 microseconds long, while the total received interval is 6 microseconds long as is illustrated with respect to FIG. 6.

Figure 7:
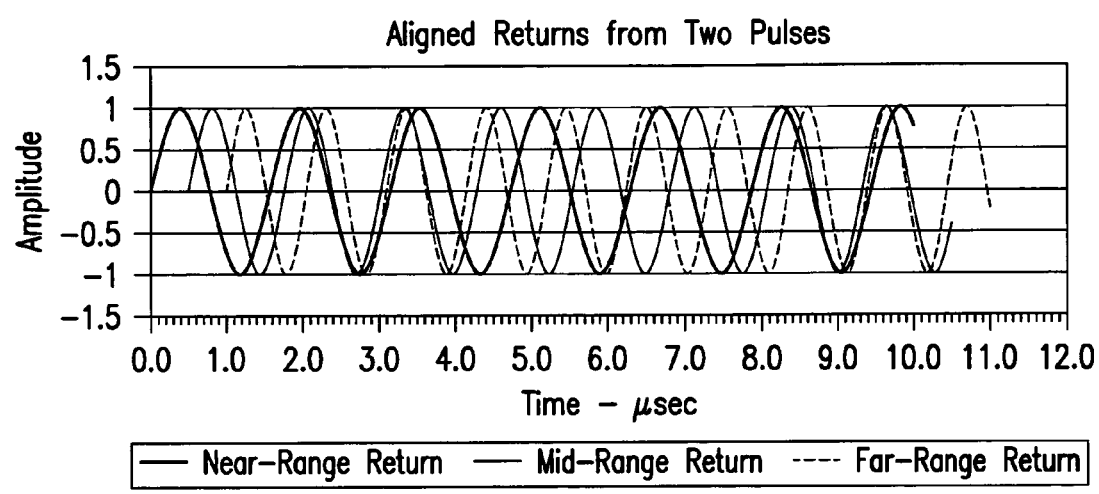
FIG. 7 illustrates aligned returns from two pulses.

The data from the second interval should be combined with the data from the first interval and must start at the same time offset as the start of the second transmit interval is offset from the start of the first transmit interval and shown in FIG. 7. This produces an overlap in the positions of some of the data from the two sets. If the sample from the two received intervals are simply added together in the overlapping areas, the data would be correct. However, during the overlapped sections of the data, the noise from both sections will be added producing repeating areas with a 3 dB noise increase.

An additional adjustment must be made to the data from the last chirp, which in this case is the third chirp. Some of the frequencies transmitted during the last chirp duplicate frequencies from the first chirp of the series. Received data from these frequencies is a duplication and needs to be eliminated. As shown in FIG. 4, the duplicated transmitted frequencies are denoted as 15 and the duplicated received frequencies are denoted as 19. Data from each of the last chirp's pulses is truncated, maintaining the same overlap with the first chirp data as occurs for all the other data overlap.

To insure that the system is operating correctly, a test of the data reassembly procedure is conducted by acquiring multiple chirp data using the delay line connected directly to the RF transceiver 12. This provides a strong, point-target-like signal and should appear as a continuous sign wave if the procedure is correct. The analog (I and Q) signals can be examined visually with a time scale appropriate to looking at individual samples to insure that there is no glitch in the data at the joining point. Additionally, a Fast Fourier transformer (FFT) covering several pulses from each chirp should yield a highly resolved return in the frequency domain.

It will be understood that modifications and variations will be effective without departing from the spirit and scope of the novel concepts of the invention.

What is claimed is:

1. A radar system for investigating surface as well as subsurface areas of interest, comprising:
   an RF transceiver and antenna in communication with said RF transceiver, both of which are provided on an elevated platform, said RF transceiver producing a plurality of chirp signals directed to at least one subsurface area of interest, said plurality of chirp signals covering an entire frequency band, wherein each individual chirp signal covers only a finite portion of the entire frequency band, said RF transceiver receiving reflected signals from at least one subsurface area of interest, said antenna transmitting said plurality of chirp signals and receiving said reflected signals in a sequential manner;
   a processing device in communication with said RF transceiver for processing said reflected signals including information relating to said at least one subsurface area of interest; and
   a storage device in communication with said processing device for storing the signals processed by said processing device relating to said at least one subsurface area of interest.

2. The radar system in accordance with claim 1, further comprising a transmit-receiver switch provided between said RF transceiver and said antenna for ensuring that there is no overlap between transmitting said plurality of chirp signals and receiving said reflected chirp signals.

3. The radar system in accordance with claim 1, wherein said processing device employs synthetic aperture radar processing for imaging said reflected signals.

4. The radar system in accordance with claim 2, wherein said processing device employs synthetic aperture radar processing for imaging said reflected signals.

5. The radar system in accordance with claim 1, wherein the first transmitted chirp signal of said plurality of chirp signals would contain a portion of a frequency range transmitted by one of the other transmitted chirp signals.

6. The radar system in accordance with claim 5, wherein said processing device eliminates the duplicate frequency range transmitted by said first transmitted chirp signal and said one of the other transmitted chirp signals.

7. The radar system in accordance with claim 1, wherein said elevated platform is airborne.

8. A radar system for investigating surface as well as subsurface areas of interest, comprising:

an RF transceiver and antenna in communication with said RF transceiver, both of which are provided on an elevated platform, said RF transceiver producing a plurality of chirp signals directed to at least one area of interest, each of said plurality of chirp signals beginning at a same first frequency as the other chirp signals and ending at a same second frequency as the other chirp signals, said second frequency greater than said first frequency, thereby requiring only a single continuously swept chirp signal to be generated for the entire frequency band between said first and second frequencies, wherein each individual transmitted chirp signal covers only a finite portion of the entire frequency band, said RF transceiver receiving reflected signals from at least one area of interest, said antenna transmitting said plurality of chirp signals and receiving said reflected signals in a sequential manner;

a processing device in communication with said RF transceiver for processing said reflected signals; and a storage device in communication with said processing device for storing the signals processed by said processing device.

9. The radar system in accordance with claim 8, further comprising a transmit-receiver switch provided between said RF transceiver and said antenna for ensuring that there is no overlap between transmitting said plurality of chirp signals and receiving said reflected chirp signals.

10. The radar system in accordance with claim 8, wherein said processing device employs synthetic aperture radar processing for imaging said reflected signals.

11. The radar system in accordance with claim 9, wherein said processing device employs synthetic aperture radar processing for imaging said reflected signals.

12. The radar system in accordance with claim 8, wherein the first transmitted chirp signal of said plurality of chirp signals would contain a portion of a frequency range transmitted by one of the other transmitted chirp signals.

13. The radar system in accordance with claim 12, wherein said processing device eliminates the duplicate frequency range transmitted by said first transmitted chirp signal and said one of the other transmitted chirp signals.

14. The radar system in accordance with claim 8, wherein said elevated platform is airborne.

* * * * *